United States Patent [19]

Nickerson et al.

[11] 3,935,151

[45] Jan. 27, 1976

[54] BLENDED LATEX BINDER FOR EXTERIOR PAINTS WITH WET PRIMED ADHESION

[75] Inventors: Richard Gorham Nickerson, Weston; Robert Thomas Bouchard, Gardner; Paul Joseph Charles Hurtubise, Fitchburg; Eugene Alfred Duchesneau, Jr., Ashburnham, all of Mass.

[73] Assignee: Borden, Inc., Columbus, Ohio

[22] Filed: Aug. 5, 1974

[21] Appl. No.: 494,597

Related U.S. Application Data

[62] Division of Ser. No. 410,129, Oct. 10, 1973.

[52] U.S. Cl.. 260/29.6 WB; 260/29.6 TA; 260/901; 428/483
[51] Int. Cl.² .................. C08L 33/06; C08L 27/06
[58] Field of Search..... 260/29.6 WB, 29.6 TA, 29.6 XA, 260/901; 117/161 UN

[56] References Cited
UNITED STATES PATENTS

| | | | |
|---|---|---|---|
| 3,424,706 | 1/1969 | Smith et al. | 260/29.6 TA |
| 3,497,467 | 2/1970 | Coleman | 260/29.6 TA |
| 3,721,636 | 3/1973 | Makower et al. | 260/29.6 TA |
| 3,736,287 | 5/1973 | Patella | 260/29.6 TA |
| 3,769,151 | 10/1973 | Knutson et al. | 260/29.6 WB |
| 3,787,232 | 1/1974 | Mikofalvy et al. | 117/161 UN |
| 3,832,317 | 8/1974 | Mikofalvy et al. | 260/29.6 TA |

FOREIGN PATENTS OR APPLICATIONS 2,139,856  2/1972  Germany

*Primary Examiner*—Harold D. Anderson
*Assistant Examiner*—W. C. Danison, Jr.
*Attorney, Agent, or Firm*—Daniel D. Mast; George A. Kap; George P. Maskas

[57] ABSTRACT

A water-based paint confers wet primed adhesion if its binder is a latex whose polymer is a vinyl chloride/acrylic or an all-acrylic containing polymerized therein (based on weight of main monomers) not only 0.3–5% of (meth) acrylic acid but also a fraction of hydroxymethyl diacetone acrylamide (HMDAA) which must be at least 1 % in case of vinyl chloride/acrylics and at least 2% in case of all-acrylics. But, surprisingly, when such a latex is diluted by blending with a vinyl acetate/acrylic latex which by itself does not confer wet primed adhesion, superior wet primed adhesion is obtainable even when the overall level of HMDAA is only 0.65% when the HMDAA latex is an all-acrylic and only 0.40% when the HMDAA latex is a vinyl chloride/acrylic.

6 Claims, No Drawings

BLENDED LATEX BINDER FOR EXTERIOR PAINTS WITH WET PRIMED ADHESION

This is a division, of application Ser. No. 410,129, filed Oct. 10, 1973.

BACKGROUND OF THE INVENTION

It is an object of the present invention to provide emulsion-polymerized latex products which can be used in formulation with pigmentary materials to provide water-based paints which have superior wet primed adhesion, i.e. paints which, after being coated over a surface of alkyd primer and dried, have a superior adhesion to the alkyd surface when subsequently exposed to water.

It is a further object of this invention to provide such latex products at minimum cost by preparing the polymers therein from monomers comprising a major amount of monomers selected from the low-cost vinyl acetate and vinyl chloride.

The market for water-based paints, containing emulsion polymerized latexes as binders, is constantly growing in preference over oil-based paints which contain organic volatile components having undesirable properties such as odor and flammability. For some applications, particularly indoor applications, it has been found satisfactory to use as the latex binder for such water-based paints, an emulsion copolymer comprising a major amount of vinyl acetate or vinyl chloride, thus effecting substantial economies.

However, a corresponding use of vinyl acetate or vinyl chloride in outdoor water-based paints has not met with equal success. When wood clapboards or shingles, for example, are first primed with a conventional exterior alkyd undercoat and then painted with a water-based paint, it is not unusual to find that the initially attractive coating soon deteriorates during repeated exposure to rainy weather. The imbibition of water at the primer/topcoat interface results in blistering and peeling.

In short, previous attempts to use latex copolymers containing polymerized therein a major portion of vinyl chloride or vinyl acetate as binders for exterior paints have resulted in products which were deficient in wet primed adhesion. This deficiency was not overcome by copolymerization with up to 5%, based on total main monomers, of a carboxylated monomer or an ethylenically unsaturated amide, or both. Thus, for example, a polymer of 70 parts vinyl chloride, 30 parts 2-ethyl hexyl acrylate plus up to 5 parts acrylic acid and/or up to 5 parts acrylamide, methacrylamide or N-methylolacrylamide does not achieve wet primed adhesion. Likewise unsuccessful in the hands of present Applicants, have been polymers containing polymerized therein 70 parts vinyl acetate, 30 parts 2-ethyl hexyl acrylate, up to 5 parts of acrylic acid and/or up to 5 parts of acrylamide or its lower alkyl or hydroxyalkyl derivatives.

SUMMARY OF THE INVENTION

A means has now been found whereby a latex vehicle conferring superior wet primed adhesion can be formulated using a major amount of monomers selected from the group consisting of vinyl acetate and vinyl chloride. This is achieved by blending a vinyl acetate/acrylic latex or a vinyl chloride/acrylic latex, which by itself does not confer wet primed adhesion, with a sufficient amount of a latex of a vinyl chloride/acrylic or all-acrylic latex whose polymer contains polymerized therein both 0.3–5% of a carboxylated monomer and also an effective amount of hydroxymethyl diacetone acrylamide (HMDAA).

In particular, this invention relates to a synergistic mixture of such latexes whereby a surprisingly low overall level of HMDAA is found to be thus effective. Exemplarily, a vinyl chloride/acrylic containing polymerized therein 70 parts vinyl chloride and 30 parts of a mixture of lower alkyl acrylates together with about 0.3–5%, based on these main monomers, of acrylic acid, by itself confers wet primed adhesion if the copolymer contains also polymerized therein at least 1% of hydroxymethyl diacetone acrylamide (HMDAA). But surprisingly when such a latex is diluted by blending with a vinyl acetate/acrylic latex (or a vinyl chloride/acrylic latex) containing polymerized therein about 0.3–5% of acrylic acid but no HMDAA, superior wet primed adhesion is obtained even when the blending proportions are such that the overall level of HMDAA is substantially less that 1.0%, exemplarily 0.40% of the total weight of main monomers.

Similarly, an all-acrylic latex containing polymerized therein a mixture of lower alkyl acrylates as main monomers (exemplarily a 50/50 blend of n-butyl acrylate and methyl methacrylate) together with 0.3–5%, based on these main monomers, of exemplarily acrylic acid and also at least 2.0% of HMDAA, confers wet primed adhesion when it is used substantially as the sole binder for a water-based paint. But, again surprisingly, when such a latex is diluted by blending with vinyl acetate/acrylic latex (or a vinyl chloride/acrylic latex) containing polymerized therein 0.3–5% of, exemplarily, acrylic acid but no HMDAA, superior wet primed adhesion is obtained even when the blending proportions are such that the overall level of HMDAA is substantially less than 2.0%, exemplarily 0.65% of the total weight of main monomers.

In accordance with the aforementioned facts, this invention comprises a novel latex blend, whose solids comprise I. in amount up to 85% of the total solids, an emulsion copolymer containing polymerized therein
  a. at least about 50 parts of a monomer selected from the group consisting of vinyl acetate and vinyl chloride;
  b. correspondingly to make 100 parts of main monomer, an acrylic monomer selected from the group consisting of $C_1$–$C_{10}$ alkyl esters of acrylic and methacrylic acids, and the $C_1$–$C_{10}$ alkyl diesters of maleic acid and fumaric acid; and
  c. about 0.3–5% based on main monomers of a carboxylated monomer selected from the group consisting of acrylic acid, methacrylic acid, itaconic acid, aconitic acid, methacrylic acid dimer, crotonic acid, isocrotonic acid, angelic acid, teglic acid, senecioic acid, hexenic acid and the $C_1$–$C_{10}$ alkyl monoesters of maleic acid and fumaric acid; and II. correspondingly in amount to make 100% of total solids, at least about 15% of an emulsion copolymer containing copolymerized therein
  d. a mixture of main monomers having an overall composition selected from the group consisting of
    d'. about 50–70 parts of vinyl chloride and correspondingly to make 100 parts of main monomer, about 30–50 parts of an acrylic monomer selected from the group consisting of $C_1$–$C_{10}$ alkyl esters of acrylic and methacrylic acids and the $C_1$–$C_{10}$ alkyl diesters of maleic acid and fumaric acid and d''. acrylic monomers selected from the group consisting of $C_1$–$C_{10}$ alkyl esters of acrylic and methacrylic acids and the $C_1$–$C_{10}$ alkyl diesters of maleic acid and fumaric acid; and e. 0.3–5% based on main monomers of a carboxylated monomer selected from the group consisting of acrylic acid, methacrylic acid, itaconic acid, aconitic acid, methacrylic acid dimer, crotonic acid, isocrotonic acid, angelic acid, teglic acid, senecioic acid, hexenic acid and the $C_1$–$C_{10}$ alkyl monoesters of maleic acid and fumaric acid; and f. sufficient hydroxymethyl diacetone acrylamide (HMDAA) to achieve an HMDAA level of at least 0.40% with respect to total main monomers in the latex blend when the emulsion copolymer II includes vinyl chloride as in (d') and 0.65% when said copolymer II main monomers correspond to the all-acrylic formulation (d'').

The HMDAA latexes having vinyl chloride as major main monomer, as used in this invention, are novel. To the best of the present inventors' knowledge, it has not previously been possible to obtain stable latexes of such composition. Various methods available to those skilled in the art of emulsion polymerization have been tried without success, including techniques commonly called "batch polymerization" and various procedures involving the gradual addition, together or separately, of the monomers or of "pre-emulsions" prepared from the monomers.

In all such cases, stability difficulties were encountered resulting in early coagulation during polmerization or poor storage stability thereafter or both. Present inventors have found unexpectedly that aforesaid difficulties can be avoided by the use of an innoculant seed latex to be defined in more detail below. Although the use of seeds in this manner is one of the techniques available to the emulsion polymerizer for experimentation, such use is not an obvious panacea that can be invoked as an expected solution, before the fact, to any emulsion copolymerization problem in particular, and it could not be predicted before the present work was accomplished that latexes which are stable under storage for at least six months could be obtained, of copolymers containing copolymerized therein HMDAA with major amounts of vinyl chloride.

Accordingly, the present invention also comprises a method for making stable vinyl chloride/acrylic/HMDAA latexes comprising the step of polymerizing the monomers on top of a seed latex prepared by the emulsion polymerization of monomers selected singly or in combination from the group consisting of $C_2$–$C_6$ alpha-olefins, vinyl halides, vinylidene halide, vinyl esters of $C_1$–$C_4$ carboxylic acids and $C_1$–$C_{10}$ alkyl esters of acrylic and methacrylic acids, in the presence of from 0.04% to about 5% based on seed latex monomers, of an anionic or nonionic surfactant.

In summary, the present invention is directed to:

new compositions of storage-stable latexes of VCl/acrylic/HYMDAA polymers having copolymerized therein about 50–70 parts vinyl chloride, about 30–50 parts of an acrylic monomer, about 0.3–5% of a carboxylated monomer and about 1–5% of hydroxymethyl diacetone acrylamide;

novel blends of non-HMDAA-containing vinyl chloride/acrylic or vinyl acetate/acrylic latexes, which by themselves do not confer wet primed adhesion to paints, with minor amounts of said HMDAA-containing vinyl chloride/acrylic latexes, or with minor amounts of HMDAA-containing all-acrylic latexes; said blends having the synergistic property of conferring wet primed adhesion at surprisingly low overall levels of HMDAA;

new latex paints with wet primed adhesion, comprising a pigmentary material and a latex binder selected from said VCl/acrylic/HMDAA latexes;

new latex paints comprising a pigmentary material and a latex binder comprising said novel synergistic blends;

a method of coating a surface, in particular a surface of a conventional exterior alkyd undercoat, which comprises applying said new latex paints, thereby conferring superior wet primed adhesion; and an object coated by the paint of this invention.

DETAILED DESCRIPTION OF THE INVENTION

The latexes which are used to make the blends of this invention can be classified as (1) the "carrier latex" which carries the hydroxymethyl diacetone acrylamide (HMDAA) copolymerized in its polymer particles and (2) the "diluting latex" whose polymer contains substantially no HMDAA.

CARRIER LATEXES

The main monomers of the carrier latex can be "all-acrylic", a term used herein to signify that all the main monomers are chosen from the group consisting of the $C_1$–$C_{10}$ alkyl esters of acrylic and methacrylic acids and the $C_1$–$C_{10}$ alkyl diesters of maleic acid and fumaric acid. Alternatively, the main monomers of the carrier latex can comprise about 50–70 parts by weight of vinyl chloride, the remaining amount to make 100 parts of main monomer, being selected from the above defined group of acrylic monomers. Latexes of this latter type are designated herein as vinyl chloride/acrylic/HMDAA latexes and are preferred, particularly for the sake of economy.

As used in the present disclosure, the term hydroxymethyl diacetone acrylamide (HMDAA) designates a reaction product of diacetone acrylamide

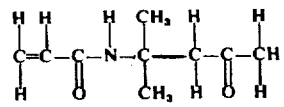

with a plurality of formaldehyde molecules, in particular, a product in which on the average between about 2.5 and 3.5 molecules of formaldehyde have reacted with each molecule of diacetone acrylamide, forming a corresponding number of hydroxymethyl (or methylol) substituent groups There are five labile hydrogens on the carbons adjacent to the acetone carbonyl of the diacetone acrylamide structure. Whereas it is known that some of the benefits of this invention can be obtained when, on the average, only one of the labile hydrogens is reacted with formaldehyde and likewise that products having up to five hydrogens thus reacted can be used, the invention is illustrated herein with HMDAA of the preferred molar ratio (formaldehyde/HMDAA) equal to about 3/1.

A product of this preferred composition can be prepared exemplarily by dissolving 3.3 mols of formaldehyde per 1 mol of diacetone acrylamide in sufficient water to bring the weight ratio of reactants/water to about 60/40, using a vessel equipped with stirrer, condenser, thermometer, and heat-exchange jacket. About 0.54% of potassium hydroxide based on weight of reactants is added in three portions as 10% aqueous solutions for the purpose of catalysis. On addition of the first KOH portion, exothermic heat is allowed to raise the temperature of the reacting mixture to about 50°C. The temperature is then held at 50°C for 6 hours, adding the second and third portions of KOH at the end of the second and fourth hours, respectively. The product is cooled to 25°C, filtered, and inhibited against autopolymerization by addition of about 0.225% methylether of hydroquinone. The finished solution has about 55% HMDAA content. A solution of substantially this composition is available commercially from The Lubrizol Corporation under the trademark "HMDAA".

The amount of HMDAA can be, exemplarily, in the range of about 1–5% based on weight of total main monomers. Larger amounts than this can, of course, be used but for the sake of maintaining a balance between cost and efficiency in conferring wet primed adhesion, it is preferred to use just sufficient HMDAA to achieve an HMDAA level of at least about 0.65% with respect to total main monomers in the entire latex blend when the carrier latex is an all-acrylic carrier latex and at least about 0.40% with respect to total main monomers in the entire latex blend when the carrier latex is a vinyl chloride/acrylic latex.

It is also preferred to include in the copolymer of the carrier latex about 0.3–5%, based on main monomers, of a carboxylated monomer. This functional monomer is chiefly for the purpose of aiding in colloidal stability of the latex particles and for obtaining certain desirable properties of the latex such as resistance to freezing and thawing, and the presence of the carboxylated monomer is not absolutely necessary for the obtaining of wet primed adhesion. The carboxylated monomer can be selected from the group consisting of acrylic acid, methacrylic acid, itaconic acid, aconitic acid, methacrylic acid dimer, crotonic acid, isocrotonic acid, angelic acid, teglic acid, senecioic acid, hexenic acid and the $C_1$–$C_{10}$ alkyl monoesters of maleic acid and fumaric acid. The preferred carboxylated monomers are acrylic acid and methacrylic acid.

The all-acrylic/HMDAA carrier latexes of this invention can be made by any conventional emulsion polymerization procedure known to those skilled in the art including procedures wherein all of the monomers are added to the beginning to an aqueous phase comprising conventional additives such as surfactants; and various procedures involving the gradual addition, together or separately, of the monomers during the course of polymerization. Example 7 illustrates a procedure in which "pre-emulsions" of the monomers are gradually added.

However, in the case of carrier latexes of vinyl chloride/acrylic/HMDAA polymers in which about 50–70% of the main monomers is vinyl chloride, the remaining amount of about 30–50% being acrylic monomers, the usual procedures of emulsion polymerization are fraught with stability difficulties manifested in coagulation either during or shortly after polymerization. The products of such procedures cannot be used to form stable blends with the diluting latexes of this invention. But unexpectedly it has been found that the use of a seed latex makes possible the obtainment of stable latexes of such vinyl chloride/acrylic/HMDAA polymers with up to about 5 parts HMDAA and about 5 parts of a carboxylic monomer chosen from the above defined group of carboxylic monomers.

The seed latex method has also been tested as a means of making the all-acrylic/HMDAA carrier latexes of this invention and is preferred. A procedure for preparing a latex using a seed is illustrated in Example 1 below. The kinds of seed latexes which can be used in general are described in the following section.

SEED LATEX

When a seed latex is used in preparing latexes for blending in this invention, such seed latex can have an average particle size between about 0.005 and 0.10 microns, particle sizes between about 0.01 and 0.05 microns being particularly suitable.

The seed latex can be prepared by the emulsion polymerization of any thus polymerizable ethylenically unsaturated compound or compounds, as described below. Any free-radical initiating system can be used to effect polymerization of the seed monomers. Any of the known methods can be used to obtain a stable dispersion and to control the particle size.

Thus, any emulsion stabilizer can be used which is capable of maintaining a latex dispersed in the form of latex particles and preventing said particles from coagulating under mechanical stress developed during the stirring of the latex. Anionic or nonionic surfactants are the preferred emulsion stabilizers and will be used herein to illustrate the invention. The emulsion stabilizer can also comprise a polymeric colloid stabilizer of the type often identified as a "colloid protective agent".

The surfactant used in preparation of the seed latex can be selected from any of the anionic and nonionic surfactants. For example, any of such surfactants customarily used in effecting emulsion polymerization can be used, including sodium lauryl sulfate, sodium dodecyl benzene sulfonate, sodium alkylsulfosuccinates, alkyl esters of sodium sulfosuccinate, sodium or ammonium salts of sulfate esters of alkyl phenoxy poly(ethyleneoxy) ethanols such as octyl or nonyl phenoxy poly(ethyleneoxy) ethanols, including the full range of ethylene oxide contents available. The aqueous composition can also contain condensates of ethylene oxide with hydrophobic bases formed by condensing propylene oxide with propylene glycol.

As will be evident to those trained in the art of emulsion polymerization, various other types of surface active agents can be applied and also certain surfactants can be used in combination to obtain a particular balance of properties. Surfactants can be introduced into the aqueous composition of the seed latex before, during or after the polymerization of the seed latex.

As to amounts, surfactants used in preparation of the seed latex can be in the usual proportions well established in the art of emulsion polymerization, as from 0.04% to about 5% based on total weight of seed latex monomers. Ordinarily, amounts between about 0.5% and 2.0% based on seed latex monomers are preferred.

The polymer of the seed latex can be a homopolymer or interpolymer whose monomer composition can be selected singly or in combination from the emulsion polymerizable ethylenically unsaturated aliphatic compounds including alpha-olefins, vinyl or vinylidene halides, vinyl esters and alkyl esters of acrylic and methacrylic acids, and dialkyl esters of maleic acid and fumaric acid, respectively with alcohols having from 1 to 10 carbon atoms. An alpha-olefin can have from 2 to 6 carbon atoms, thus it can be ethylene, propylene, butene-1 or hexene-1. A vinyl halide can be vinyl chloride or vinyl bromide. A vinylidene halide can be vinylidene chloride. A vinyl ester can be derived from any carboxylic acid with one to four carbon atoms, thus it can be vinyl formate, vinyl acetate, vinyl propionate or vinyl butyrate. The "acrylic" type esters are defined in greater detail below in describing the overall composition of the blending latexes of this invention.

Illustratively, the polymer of the seed latex can be polyethylene, polyvinyl chloride, polyvinyl acetate, poly(methyl methacrylate), poly(ethyl acrylate), poly(2-ethyl hexyl acrylate), a copolymer of methyl acrylate and vinyl acetate, a copolymer of vinyl chloride and minor amount of ethylene or a copolymer of vinyl chloride with 99 to 1% of one of the other said ethylenically unsaturated compounds. Preferred seed latexes are polyvinyl chloride, polyvinyl acetate and poly(2-ethyl hexyl acrylate).

The seed latex can be prepared beforehand in a separate vessel and desired aliquot can then be introduced into the aqueous composition of this invention. Alternatively, the seed latex can be made "in situ" in all or part of the aqueous composition used to prepare the blending latex itself; in such event, the preparation of the seed latex is completed before proceeding with the addition of the monomers to be polymerized into the particles of the blending latex. Example 1 below illustrates the preferred use of a previously prepared polyvinyl chloride seed in the preparation of a vinyl chloride/acrylic/HMDAA carrier latex. Additional examples of applicable seed latexes are disclosed in U.S. Pat. No. 3,721,636, Examples 2 and 3.

As to the amount of the seed latex, sufficient is used so that the weight proportion of seed latex solids to total solids of the finished product will be in the range between about 0.01% and 10%, preferably in the range between about 0.5% and 3%. In general, the amount of seed latex contained initially by the aqueous composition used in preparation of the "carrier" or "diluting" latex can be such that the seed solids are between about 0.01% and 10% by weight of said aqueous composition. The preferred range of seed solids is between about 0.5% and 3% of the weight of the initial aqueous composition before monomer addition.

In the preferred method of using a seed to prepare a stable latex of 50–70 vinyl chloride/30–50 acrylic/0-.3–5 carboxylic acid/0.1–5 HMDAA copolymer, a reactor is charged with water, surfactant, seed latex and initiating system and all the monomers are then simultaneously and gradually added to this emulsifying composition over a period of at least about 12 hours. The monomers other than HMDAA can be added in admixture; the HMDAA is preferably added in a separate stream. Surfactant solution is added simultaneously at a rate to maintain surface tension in the range about 33–40 dynes/cm$^2$. The temperature of the reacting system can be in the range of about 50°–65°C, preferably in the range about 55°–60°C. As will be obvious to those skilled in the art, the rate of adding the monomers is adjusted to maintain exothermic reaction at the temperature chosen.

DILUTING LATEXES

The diluting latex to be used in carrying out the instant invention can be an emulsion copolymer containing polymerized therein about 50–70 parts vinyl chloride, the remaining monomer to make 100 parts of total main monomer being an acrylic monomer as above described. Or the diluting latex can be an emulsion copolymer containing polymerized therein about 50–98 parts of vinyl acetate, the remaining monomer to make 100 parts of total main monomer again being an acrylic monomer as above described. Again, it is preferred to include in these copolymers about 0.3–5%, based on main monomers of a carboxylated monomer, although this is not absolutely required for the purpose of obtaining wet primed adhesion. In general, as in all the latexes used for blending in this invention, the preferred level of carboxylated monomer is from about 0.2–1.5%, based on main monomers.

POLYMERIZATION CONDITIONS

As will occur to those skilled in the art of emulsion polymerization, a number of reaction parameters can be varied while working within the scope of this invention. Thus, the emulsion copolymerization can be initiated by any known free-radical donating system including substances which undergo scission under the influence of heat and substances which are caused to form free-radicals by reaction with reducing agents. Water-soluble initiators are usually to be preferred, including potassium, ammonium or sodium persulfate or peroxydiphosphate, and others which will be known to those skilled in the art. When reducing agents are used, it is again preferred to use materials which are water-soluble such as sodium formaldehyde sulfoxalate, sodium metabisulfite and ascorbic acid.

Likewise, a range of temperatures is possible from about room temperature or lower when redox systems are used to about 100°C or above. Preferably, a temperature about 50°–70°C is used. In the case of volatile monomers like vinyl acetate, the temperature can be controlled by refluxing the volatile monomer. In the case of vinyl chloride, for example, the polymerization vessel can be pressurized. Maintaining the reaction under inert atmosphere is desirable. The initiator can exemplarily be used in amount about 0.1–5%, especially 0.2–2%, based on the weight of the aqueous emulsifying composition before addition of the monomers. If a reducing agent is used, it also is used in amount totaling about 0.1–5%, especially 0.2–2%, of said aqueous emulsifying composition.

As to the surfactant system to be used in the preparation of carrier or diluting latexes, this can employ any anionic or nonionic surfactants used singly or in combination. In particular, the same surfactants which have been enumerated above for use in preparing a seed latex are also satisfactory for the preparation of the carrier or diluting latex itself. Amounts of surfactants can be used in the usual proportions well established in the art of emulsion polymerization, the preferred range being from 0.5–5%, based on the weight of the aqueous emulsifying composition before addition of monomers. Thus, if a 50% solids latex is desired, the surfactant can be in amount from 0.5–5%, based on the total monomer. The particular amount and addition schedule can be chosen such as to control particle size and eventual stability of the product latex. Surfactants can be introduced into the aqueous composition all from the start, or gradually during the period of polymerization.

Polymeric colloid stabilizers can also be used to assist in maintaining dispersion of the latex in the form of latex particles and preventing said particles from coagulating under mechanical stress such as under stirring. Such polymeric stabilizer can, exemplarily, be starch, gelatin, casein, hydroxyethyl cellulose, carboxymethyl cellulose, polyvinyl alcohol of both fully hydrolyzed and partially hydrolyzed grades, polyvinyl pyrrolidone and the like. The colloid stabilizer can be used in amount up to about 10% of the total copolymer weight, between about 1% and 5% being particularly suitable.

The solids content of the carrier and diluting latexes of this invention, as also the blends thereof, can range from as low as 20% by weight or lower, to as high as 70% or higher based on the total weight of latex.

BLENDING PROPORTIONS

The synergistic blends of this invention are made in the following manner.

When the carrier latex is a vinyl chloride/acrylic/HMDAA latex and the diluting latex is either a vinyl acetate/acrylic or a vinyl chloride/acrylic latex, the following table shows the minimum HMDAA content of the carrier latex which can confer a wet primed adhesion property respectively to a series of exemplary blends. These blends are expressed as the weight ratio of carrier polymer to diluting latex polymer.

| % HMDAA per main monomer in carrier polymer | Carrier/diluting polymer ratio |
|---|---|
| 1.00 | 40/60 |
| 1.33 | 30/70 |
| 2.00 | 20/80 |
| 2.67 | 15/85 |

Similarly, when the carrier latex is an all-acrylic/HMDAA latex and the diluting latex is a vinyl acetate/acrylic or a vinyl chloride/acrylic latex, the following table shows the minimum HMDAA content of the carrier latex which can confer a wet primed adhesion property, respectively, to a series of exemplary blends. The blends are again expressed as the weight ratio of carrier polymer to diluting polymer.

| % HMDAA per main monomer in carrier polymer | Carrier/diluting polymer ratio |
|---|---|
| 1.63 | 40/60 |
| 2.17 | 30/70 |
| 3.25 | 20/80 |
| 4.34 | 15/85 |

ACRYLIC MONOMERS CONTEMPLATED

Acrylic monomers are used in copolymerizing the all-acrylic and vinyl chloride/acrylic carrier latexes of this invention, and also the vinyl chloride/acrylic and vinyl acetate/acrylic diluting latexes of this invention. Their selection can be varied within the scope of this invention, according to principles well understood by those skilled in tailormaking polymers for use in paints and allied arts, so as to obtain benefits of coalescence, levelling, abrasion resistance and other desirable properties. Present Applicants have studied a wide assortment of proportions of different acrylate monomers within the stated ranges as summarized above, both among themselves and together with either vinyl chloride or vinyl acetate, in the stated ranges, and have found consistently that primed wet adhesion is always obtained when the stated restrictions concerning the blending properties are met. As above stated, the term "acrylic" monomer as used herein designates monomers chosen from the group consisting of the $C_1$–$C_{10}$ alkyl esters of acrylic and methacrylic and the $C_1$–$C_{10}$ alkyl diesters of maleic acid and fumaric acid. Thus, the acrylic monomer can be any ester of acrylic or methacrylic acid, or any diester of fumaric or maleic acid, respectively with any straight-chain, branched or cyclic alcohol having from 1 to 10 carbon atoms, as, for example, methyl alcohol, ethyl alcohol, n-propyl alcohol, isopropyl alcohol, n-butyl alcohol, isobutyl alcohol, secondary butyl alcohol, tertiary butyl alcohol, n-amyl alcohol, isoamyl alcohol, tertiary amyl alcohol, n-hexyl alcohol, cyclohexanol, n-octyl alcohol, capryl alcohol or n-decyl alcohol. Thus, exemplarily, an alkyl acrylate can be methyl acrylate, isopropyl acrylate, ethyl acrylate, 2-ethylhexyl acrylate, n-octyl acrylate, butyl acrylate, isobutylacrylate or decyl acrylate; an alkyl methacrylate can be methyl methacrylate, ethyl methacrylate, propyl methacrylate, isopropyl methacrylate, butyl methacrylate, isobutyl methacrylate, 2-ethylhexyl methacrylate, n-octyl methacrylate or decyl methacrylate; a dialkyl maleate can be dimethyl maleate, diisopropyl maleate, diethyl maleate, di(2-ethylhexyl maleate), di(n-octyl)maleate, dibutyl maleate, di(isobutylmaleate) or didecyl maleate; and a dialkyl fumarate can be dimethyl fumarate, diethyl fumarate, dipropyl fumarate, diisopropyl fumarate, dibutyl fumarate, di(isobutyl)fumarate, di(2-ethylhexyl fumarate), di(n-octyl)fumarate or didecyyl fumarate. Also the diester can be a mixed ester, as for example ethyl decyl fumarate and butyl octyl maleate.

PAINT FORMULATION

The latexes and latex blends of this invention can be formulated with pigmentary material by any procedure known in the latex water-based paint formulation art. The pigmentary material conventionally includes primary pigments and extender pigments, both of which are preferably used in the comminuted form of common practice. Other adjuvants can also be added as dispersants, leveling agents, tinting agents, antifreezing agents, thickening agents, coalescing agents and the like. Any suitable method of combining the several ingredients can be used. Preferably, an aqueous paste of pigments and adjuvants is first ground at high shear and then combined with the latex using simple stirring.

In general, the water-based paints of this invention can have a ratio of latex solids to total latex plus pigment solids equal to about 20–50%, the preferred ratio being about 25–40%. Total solids content of the paint can be about 40–65%.

Among the pigmentary materials which can exemplarily be used in formulating the water-based paints of the present invention are titanium dioxide, zinc oxide, iron oxide, chromium oxide, zinc sulfide, carbon black, copper phthalocyanine, cadmium sulfide and cadmium selenide. Extender pigments can exemplarily be calcium carbonate, anhydrous sodium potassium aluminum silicate, clay, mica, silica, talc and barytes.

The water-based paints of this invention can be applied to the substrate surface in any conventional manner including brushing, spraying and roller-coating, among others. Paints of this invention can be used both indoors and outdoors. Their excellent adhesion to alkyd undercoats makes them also excellent paints for coating over old coats of conventional alkyd paints without requiring prior removal of such previous paints.

The latexes and latex blends of this invention generally have a pH in the range about 4–7. In formulating these latexes into paints, it is preferred to adjust the homogenized paint to a pH in the range about 7.5–10, preferably about 8.0–9.5. Any of the conventional alkalizing agents are suitable. Because of its high volatility and low cost, the preferred alkaline adjustment agent is aqueous ammonia, i.e. ammonium hydroxide. In the examples below, the paints were thus adjusted to pH about 8.5. Alternatively, as in Example 1, the latex can be adjusted to the alkaline side before formulating with pigmentary material.

TESTING FOR "WET ADHESION"

For the purpose of measuring "wet adhesion" of latex paints, a surface of alkyd undercoat was first prepared by applying a 7.0 mil layer of a typical alkyd-based exterior wood undercoater to the entire surface of a 6.5 × 17 inch plastic sheet (Leneta Panel No. 121-10N, obtained from Leneta Company, Hohokus, New Jersey), using a Dow film coater and making the draw-down in the lengthwise direction of the panel.

Various alkyd-based exterior commercial undercoats were found to be usable interchangeably for the purpose of this test without influencing the test results. Thus, the exact formulation of the undercoat is not critical nor at the heart of the instant invention. Exemplarily, equivalent results have been obtained with both Sherwin-Williams 450 Undercoater and with Sherwin-Williams "Exterior Wood 1027-8 White". The representative formulation of the latter is stated by the manufacturers to be equal parts by weight of (a) pigment consisting of 26% titanium dioxide (having 94% TiO$_2$) and 74% calcium carbonate with (b) vehicle consisting of 47% tall oil alkyd resin 6% soya alkyd resin, 1% di(alkylsulfonyl)methylene and 46% mineral spirits.

Preferably the undercoat is tinted with any conventional tint used in paints of this type, in order to facilitate visual observation of the test results.

The coated panels were allowed to cure for 4 days at room temperature before use and were used only during the period including the subsequent seven days.

Each latex paint sample to be tested was cast on an undercoated panel at 6 mil wet thickness using a Bird applicator. The paint film was cast in a direction at right angles to the direction used in application of the undercoating. Each "draq-down" was 3 inches wide, permitting four or five different parallel draw-downs to be made on one panel. The painted panel was then allowed to cure for a period of 24 hours at room temperature. At the end of the curing period the panels were submerged for 20 minutes in water at room temperature. The panels were then removed from the water and the excess water was gently removed from the panels by means of a dry cloth towel.

A straightedge was then placed parallel to the lengthwise dimension of the test panel at a distance ½ inch from the edge at which the paint draw-downs were terminated; and a deep cut was made by drawing a razor blade against the length of the straightedge. A strip of half-inch wide masking tape was then firmly applied on top of and parallel to each test paint film and the tape was then pulled from the paint film on one rapid stroke, commencing at the edge near the razor cut. A new strip of tape was firmly applied immediately thereafter and pulled in the same manner. The operation was repeated until paint film was removed from the alkyd undercoating. If no wet paint film was removed after five consecutive pulls, the wet adhesion was deemed to be excellent. Otherwise, the relative degree of wet adhesion was expressed as the number of tape pulls required for failure.

This test was rendered less subjective by repeating draw-downs on different panels and in different positions on the panels. In general, very good agreement was obtained among such repeat tests. Variations in adhesive strength of the masking tape and in the firmness of its application to the paint surface were not sufficiently large to be confounding in a statistical sense. The use of a heavy roller to assure uniformity in application of tape was found unnecessary. Experience has shown that paints which pass five pulls in this test have excellent wet primed adhesion also in prolonged weathering tests whereas paints which fail this pull test develop peeling and blistering on exposure to weather.

This invention will be further illustrated by description in connection with the following specific examples of the practice of it wherein, as also elsewhere herein, proportions are in parts by weight unless stated otherwise.

EXAMPLE 1

This example illustrates the preparation of a vinyl chloride/acrylic latex whose solids contain 1.5% by weight of HMDAA containing reacted therein 3 mols of formaldehyde per 1 mol DAA.

A polyvinyl chloride seed latex was first prepared in a separate reaction as follows:

Using a pressure kettle equipped with stirrer and means for introducing reactants, 60.6 grams of sodium lauryl sulfate were dispersed in 11,550 grams of deionized water. There was then added 6060 grams of vinyl chloride monomer and 24.2 grams sodium persulfate. Polymerization was carried out at 40°C to 60°C accelerated by the gradual addition of 100 ml of 5% aqueous sodium formaldehyde sulfoxylate. The resultant seed latex had a solids content of 34.6% and was post-stabilized by the addition of 60.6 grams of sodium lauryl sulfate. Average particle size of the seed latex was 0.035 microns. The pH was equal to 2.0.

A reactor was then charged with 40.0 parts by weight of deionized water, 0.12 parts disodium phosphate, 0.12 parts monosodium phosphate, 0.02 parts of sodium dodecyl benzene sulfonate and 0.25 parts of the above described seed latex. These contents were heated with stirring to 135°F. The reactor was evacuated to 4.5 inches of mercury, returned to zero psig with vinyl chloride vapor and re-evacuated to about 15 mercury inches. There was then introduced by suction a solution of 0.14 parts of sodium persulfate in 1.24 parts of deionized water, again returning to zero psig using vinyl chloride vapors. Small increments of more sodium dodecyl benzene sulfonate were then added until a surface tension of about 39–40 dynes/cm$^2$ was reached.

Beginning as soon as surface tension was thus adjusted, a monomer mixture containing 27.4 parts vinyl chloride, 14.6 parts 2-ethyl hexyl acrylate, 7.41 parts n-butylacrylate and 0.25 parts glacial acrylic acid was added gradually over a period of 14 hours. At a time one-half hour later than the time of starting the monomer feed, there was also added gradually and simultaneously 1.35 parts of a 55% aqueous solution of hydroxymethyl diacetone acrylamide ("HMDAA") and also a "soap feed" solution containing 0.07 parts tetrasodium pyrophosphate, 1.06 parts octadecyl sulfosuccinamate, 0.37 parts sodium dodecyl benzene sulfonate and 0.25 parts of the above described seed latex in 3.21 parts of deionized water. The HMDAA solution was added over a period of 13.5 hours. The "soap feed" was added over a period of 14 hours. The incremental additions of the "soap feed" were adjusted to maintain a surface tension at 42–45 dynes/cm$^2$ during the first hour of such addition, thereafter at 36–40 dynes/cm$^2$ up until 3.5 hours of such addition, thereafter at 33.5–36.5 dynes/cm$^2$ until such addition was completed.

Upon simultaneous completion of the additions of the monomer mixture and the HMDAA solution, the temperature of the resulting latex was elevated to 145°F and held there for three additional hours, at which time the pressure had dropped to about 11 psig. The latex was then cooled to 90°F while releasing pressure slowly to avoid foam. The latex was then stripped of residual monomer under vacuum conditions with careful control of agitation to avoid excess foam. A final heating at 110°F was carried out at 15 inch vacuum over a period of a half hour. The latex was then cooled to 90°F.

There were then added 0.59 parts of a 26% aqueous ammonia solution and 0.03 parts of a 37% aqueous formaldehyde solution. After an additional half hour's mixing, the finished latex was poured into drums. The resultant latex had a solids content equal to 52.8%, the average particle size was 0.35 microns, the pH was equal to 8.8. Brookfield viscosity was less than 75 cps. and mechanical stability (resistance to rapid agitation) was excellent.

EXAMPLE 2

A pigment slurry was prepared by mixing the following components in a Cowles mixer at high shear:

| Component of Pigment Slurry | Parts by Weight |
|---|---|
| Water | 25.51 |
| 3% Aqueous Solution of Carboxymethyl Cellulose (Methocel 4000) | .07 |
| Nonyl Phenyl Polyethylene Glycol Ether (Tergitol NP 15) | .04 |
| Soya lecithin | .04 |
| Polyoxyethylated vegetable oil (Emulphor EL 719) | .02 |
| Rutile Titanium Dioxide | 21.60 |
| Anhydrous sodium potassium aluminum silicate | 14.10 |
| Water-ground mica | 2.40 |
| Diethylene glycol monoethylether | 1.40 |
| Ethylene glycol | 1.50 |
| Phenyl mercuric acetate | .01 |
| Commercial defoamer (Colloids 581) | .01 |

Thus, this pigment slurry contains 38.1 parts pigment solids.

To 66.7 parts of this pigmented slurry there were added 33.3 parts of the latex of Example 1 and these components were gently mixed into a homogeneous paint.* This paint contained latex solids in an amount corresponding to 31.6% of the total latex plus pigment solids. When this paint was tested for "wet adhesion" by the above described procedure, it was found to pass successfully five pulls of the masking tape.

*The pH was adjusted to 8.5 by addition of sufficient concentrated ammonium hydroxide.

EXAMPLE 3

A latex was prepared according to the same procedure as in Example 1 and with the same composition except that no hydroxyethyl diacetone acrylamide was used, i.e., the addition of HMDAA solution was omitted. The resultant stable latex had a solids content equal to 53%, the average particle size was 0.32 microns, the pH was equal to 8.7. A paint was made by adding 66.7 parts of the latex of this example to 33.3 parts of the pigmented slurry of Example 2. This paint contained latex solids in an amount corresponding to 31.6% of the total latex and pigment solids.

A similar latex preparation was carried out except that HMDAA was used in an amount corresponding to 0.75% based on total main monomers and a corresponding paint was made in a similar manner.

Wet adhesion tests were then carried out on the two paints of this example. The tests showed that the paint which contained no HMDAA failed after the first pull of adhesive tape, most of the top coat being removed by the tape, and that the paint which contained 0.75% HMDAA based on main monomers of binder polymer solids passed one pull but failed on the second pull with complete removal of the top coat. These paints are not examples of the instant invention, but illustrate that desirable wet primed adhesion is not conferred by the vinyl chloride/acrylic binder when the HMDAA is either absent or at the 0.75% level.

EXAMPLE 4

A latex was prepared of a copolymer containing polymerized therein 82 parts of vinyl acetate per 18 parts on n-butylacrylate with 0.5 parts of acrylic acid but with no HMDAA. The method used to prepare this latex was a conventional procedure wherein 10% of all the monomers is added to the initial aqueous emulsion composition and the remaining monomer added continuously during the course of the polymerization. The initiator was potassium persulfate in an amount equal to 0.54% based on total monomer and the surfactants were nonylphenyl polyethylene glycol ethers in an amount equal to 2.9% based on total monomer. Hydroxy ethyl cellulose was also used as a protective colloid at a level corresponding to 1.4% based on total monomer. The polymerization temperature was maintained between 75°–80°C. This latex, identified as latex 4A, has a solids content equal to 55%, an average particle size equal to 0.6 microns and the pH was 5.8. Brookfield viscosity was 700 cps.

Using substantially the same polymerization procedure, a latex was prepared having polymerized therein 77 parts vinyl acetate, 13 parts dioctylmaleate and 10 parts 2-ethylhexyl acrylate with 0.75 parts acrylic acid and no HMDAA. This latex, identified as latex 4B, had a solids content equal to 54.5%, an average particle size equal to 0.55 microns and the pH was 5.4. Brookfield viscosity was 1800 cps.

In a similar manner, a latex was prepared of a polymer containing polymerized therein 60 parts vinyl acetate, 20 parts dioctylmaleate and 20 parts dibutylmaleate. This latex, identified as latex 4C, had a solids content equal to 55.3%, an average particle size equal to 0.8 microns and the pH was 4.8. Brookfield viscosity was 1650 cps.

Paints were prepared from these latexes using the procedure of Example 2, namely, mixing 66.7 parts of a pigmented slurry of Example 2 with 33.3 parts of latexes 4A, 4B and 4C, respectively. These paints contained latex solids in amounts corresponding to 32.2%, 32.1% and 32.3%, respectively, of the total latex and pigment solids. All these paints failed the wet adhesion test in the first pull of the masking tape.

Blends were then made of the latex of Example 1, containing 1.5% level of HMDAA with, respectively, latexes 4A, 4B and 4C. The blends were made in such proportions that the polymer solids contributed by each "diluting" latex were 7/3 times as great as the polymer solids contributed by the latex of Example 1. In other words, aliquots of the respective latexes were combined in such a manner as to total per 100 parts of total polymer, 70 parts of the polymer of either latex 4A, latex 4B or latex 4C, together with 30 parts of the polymer of the latex of Example 1. The latex blend using latex 4A had a solids content equal to 54.3%, a pH of 5.9 and the Brookfield viscosity was 320 cps. The latex blend using latex 4B had a solids content equal to 54.0%, a pH of 5.5 and the Brookfield viscosity was 88 cps. The latex blend using latex 4C had a solids content equal to 54.5%, a pH of 4.9 and the Brookfield viscosity was 760 cps.

Paints were then respectively made from the three blends using the procedure of Example 2 wherein the ratio of latex solids to total latex and pigment solids was, respectively, 32.0%, 31.8% and 32.1%. When these paints were tested for wet primed adhesion, they were found surprisingly in each case to pass successfully five pulls of the masking tape, even though the overall level of HMDAA per total polymer solids was only 0.45%.

EXAMPLE 5

A latex blend was prepared by mixing aliquots of the latex of Example 1 with the latex of Example 3 in such proportions that for every 100 parts of total polymer in the blend there were 30 parts of the polymer of the latex of Example 1 and 70 parts of the latex of Example 3. The resultant stable blend latex had a solids content equal to 52.9%. A paint was then made by adding 33.3 parts of this latex to 66.7 parts of the pigmented slurry of Example 2. This paint contained latex solids in an amount corresponding to 31.5% of the total latex plus pigment solids. When this paint was submitted to the wet primed adhesion test, it was found to pass successfully five pulls of the masking tape, even though the overall level of HMDAA based on total latex polymer solids was 0.40%.

EXAMPLE 6

A series of paints is made substantially according to the procedure of Example 2 and using as the HMDAA latex binder blends of vinyl acetate copolymer latex 4B with vinyl chloride/acrylic/HMDAA latexes made according to the procedure of Example 1 and having the same ratio of vinyl chloride/2-ethyl hexyl acrylate/n-butylacrylate but containing different amounts of HMDAA copolymerized therein. The ratio of the polymer solids from latex 4B to the polymer solids of the particular vinyl chloride/acrylic/HMDAA latex blended is, respectively, 60/40, 70/30, 80/20 and 85/15. The amount of HMDAA in each vinyl chloride/acrylic/HMDAA latex is sufficient in each case to make the overall level of HMDAA based on total polymer in the blend at least 0.4%. Paints are made from these blends according to the procedure of Example 2 and in all cases the paints have excellent wet primed adhesion.

A similar series is prepared in which the first latex described in Example 3, having no HMDAA copolymerized therein, is used in place of latex 4B. Again, the corresponding paints all have excellent wet primed adhesion.

Still another series of paints is similarly prepared using as binder, blends made up to contain 75 parts of diluting polymer to 25 parts of carrier polymer using throughout as the carrier latex, a latex prepared as in Example 1 and having the composition of the latex of Example 1 except that the HMDAA content is 2.0% based on main monomers of this diluting latex. In successive experiments, there is used as the diluting latex polymer, copolymers having the compositions of vinyl chloride/2-ethyl hexyl acrylate equal, respectively, to 50/50, 55/45, 60/40, 65/35 and 70/30. Corresponding experiments are made wherein the diluting latex of successive experiments has a composition of vinyl acetate/2-ethyl hexyl acrylate equal, respectively, to 50/50, 60/40, 70/30, 80/20, 90/10 and 98/2. In all cases the paints have excellent wet primed adhesion.

EXAMPLE 7

This example illustrates the preparation, for the purpose of carrying out this invention, of an all-acrylic latex whose solids contain 3.25% by weight of HMDAA containing reacted therein 3 mols of formaldehyde per 1 mol DAA. A pre-emulsion feed tank adapted with an agitator was charged with 41.13 parts by weight of deionized water followed by 2.86 parts of a 55% aqueous solution of hydroxymethyl diacetone acrylamide (HMDAA), 2.86 parts of a 70% aqueous solution of octyl phenyl polyethoxy ethanol and 1.06 parts of nonyl phenoxy (ethyleneoxy) ethanol; followed by 24.16 parts of n-butylacrylate, 24.16 parts of methyl methacrylate and 0.509 parts of methacrylic acid. After these substances were thoroughly mixed, a nitrogen blanket was applied to the feed tank. A reactor, equipped with agitator and heatexchange jacket, was charged with ⅓ of the above described pre-emulsion, under agitation. A nitrogen purge was maintained for 20 minutes. The reactor contents were then heated to 50°C.

Two other feed tanks were charged respectively with 0.225 parts of sodium persulfate in 1.40 parts of deionized water and 0.225 parts of sodium metabisulfite in 1.40 parts of deionized water.

When the contents of the reactor had reached 50°C, the nitrogen purge was changed to a nitrogen blanket and ⅓ of the sodium persulfate solution as well as ⅓ of the sodium metabisulfite solution was added to the contents of the reactor. An exothermic polymerization proceeded immediately as was evidenced by the rise in temperature which was allowed to reach 60°–63°C and held at this level by cooling until exotherm stopped. At this point 9% of each of the sodium persulfate and sodium metabisulfite solution was added, commencing new exotherm. The contents were maintained at 60°–63°C until the absence of exotherm was indicated. A second ⅓ portion of the pre-emulsion was then added to the reactor and the temperature of the contents was adjusted to 50°C. Then 22% of each of the sodium persulfate and sodium metabisulfite solutions were added. Again, the batch temperature was allowed to rise to 60°-63°C and held there by external cooling until the exotherm stopped. Again, at this point, 9% of the sodium persulfate solution and 9% of the sodium metabisulfite solution were added and the batch was kept at 60°-63°C until exotherm stopped.

The remaining pre-emulsion was then added to the reactor and the batch temperature adjusted to 50°C. At this temperature, 17% of the sodium persulfate and 17% of the sodium metabisulfite solution were added, the batch temperature was allowed to rise to 60°-63°C and held there by the application of external cooling until the exotherm stopped. At this point, the remaining 9% of the sodium persulfate solution and 9% of the sodium metabisulfite solution were added and the final stage of reaction continued at 60°-63°C until exotherm stopped. The finished latex was vapor stripped, cooled and discharged into drums. This latex had a solids content equal to 53.1% and its pH was 4.1. The surface tension was 43 dynes/cm$^2$; Brookfield viscosity (No. 1 spindle; 60 rpm) was 40 cps.

EXAMPLE 8

To 66.7 parts of a pigmented slurry prepared as in Example 2 there were added 33.3 parts of the latex of Example 7 and these components were gently mixed into a homogeneous paint. This paint contained latex solids in an amount corresponding to 31.5% of the total latex plus pigment solids. When this paint was tested for wet primed adhesion, it was found to pass successfully five pulls of the masking tape.

Using the polymerization procedure of Example 7, an all-acrylic latex was prepared having the same overall composition except that the HMDAA level was reduced to 2.0% by weight of total solids and the level of methacrylic acid was reduced to the level of 0.67% of total solids. When this latex was similarly compounded into a paint at the same 31.5% level of latex solids to total latex plus pigment solids, the wet primed adhesion test was again found to pass successfully five pulls of the masking tape.

EXAMPLE 9

When an all-acrylic latex was prepared as in Examples 7 and 8 except that the levels of HMDAA and methacrylic acid were 0.65% and 0.21%, respectively, a corresponding paint compounded as in the preceding examples failed the wet primed adhesion test at the first pull. This is not an example of the instant invention.

EXAMPLE 10

A latex was prepared using the procedure of Example 7 with the monomer composition corresponding to 75 parts by weight vinyl acetate and 25 parts n-butylacrylate to make 100 parts of main monomer, plus 0.67 parts acrylic acid and 2.0% HMDAA. This latex had a solids content equal to 50.4% and its pH was 2.7. The surface tension was 42 dynes/cm$^2$ and its viscosity was 51 cps.

When formulated into a paint using the previously described procedure as in Example 2, this paint was found to have poor wet primed adhesion, passing only two pulls of the masking tape.

When a corresponding latex was prepared of a polymer containing polymerized therein 75 parts vinyl acetate, 25 parts n-butylacrylate, 0.33 parts acrylic acid and only 1.0% HMDAA, a paint similarly compounded from this latex had virtually no wet primed adhesion, failing the first pull of the masking tape. The paints of this example are not illustrations of the instant invention.

EXAMPLE 11

Using the same polymerization procedure as in Example 7, a latex was prepared of a 97/3 vinyl acetate/dioctyl maleate copolymer containing no functional monomers. A corresponding paint formulated from this latex according to the procedure of Example 2 was found to fail the wet primed adhesion test after one pull of the masking tape.

The vinyl acetate/copolymer latex of this example was then blended with the latex of Example 7 whose polymer solids contained polymerized therein n-butylacrylate/methylmethacrylate/methacrylic acid/HMDAA in the weight proportions 50/50/1.1/3.25. The blend was made by carefully mixing 20 parts of the all-acrylic HMDAA-containing latex of Example 7 with 80 parts of the polyvinyl acetate latex of this example, corresponding to a ratio of HMDAA-containing polymer to vinyl acetate copolymer in the total polymer solids equal to about 1/4 and also corresponding to an overall functional monomer content of 0.21% methacrylic acid and 0.65% HMDAA based on total weight of polymers in the blend. This blended latex was then formulated into a paint using the procedure of Example 2. This paint contained latex solids in an amount corresponding to 31.4% of the total latex plus pigment solids. When this paint was tested for wet primed adhesion, it was found surprisingly to pass successfully five pulls of the masking tape, a result completely unexpected in view of the fact that in the unblended all-acrylic latex of Example 9, a level of only 0.65% HMDAA was insufficient to confer wet primed adhesion.

EXAMPLE 12

Aliquots of the carrier latex of Example 7 were combined in separate experiments with aliquots of the diluting latexes 4A, 4B and 4C of Example 4, in such a manner as to make the weight ratio of carrier polymer to diluting polymer equal to 20/80. Corresponding paints were formulated according to the procedure of Example 2. In all cases the paint passed at least five pulls of the masking tape in the primed adhesion test.

EXAMPLE 13

A latex was prepared by the procedure of Example 1, with the same composition except that acrylic acid was absent. When this latex, not containing a carboxylated monomer, was formulated into a paint as described in Example 2, this paint was found to pass five pulls of the masking tape in the wet primed adhesion test.

Blends were then made in which the polymer solids contained 30 parts of the polymer solids of the non-carboxylated carrier latex of this example per 70 parts of the polymer solids of, respectively, Latex 4A, Latex 4B and Latex 4C. Corresponding paints were formulated from these three blends using the procedure of Example 2. In every case the wet primed adhesion test successfully passed five pulls of the masking tape.

What is claimed is:

1. A latex blend capable of conferring wet primed adhesion to paints comprising

I. up to about 85% of the total solids of an emulsion copolymer containing polymerized therein
   a. at least about 50 parts by weight of a monomer selected from the group consisting of vinyl acetate and vinyl chloride.
   b. sufficient monomer selected from the group consisting of $C_1$–$C_{10}$ alkyl esters of acrylic and methacrylic acids, and the $C_1$–$C_{10}$ alkyl diesters of maleic acid and fumaric acid to make 100 parts by weight of (a) and (b) monomers, and
   c. about 0.3-5% based on the total of said (a) and (b) monomers of a carboxylated monomer selected from the group consisting of acrylic acid, methacrylic acid, itaconic acid, aconitic acid, methacrylic acid dimer, crotonic acid, isocrotonic acid, angelic acid, teglic acid, senecioic acid, hexenic acid and the $C_1$–$C_{10}$ alkyl monoesters of maleic acid and fumaric acid; and II. to make 100% of the total solids, at least about 15% of an emulsion copolymer chosen from the group consisting of A. an emulsion copolymer containing copolymerized therein
   d. about 50-70 parts of vinyl chloride,
   e. about 30-50 parts of monomers selected from the group consisting of $C_1$–$C_{10}$ alkyl diesters of maleic acid and fumaric acid to make 100 parts by weight of (d) and (e) monomers,
   f. about 0.3-5%, based on said (d) and (e) monomers, of a carboxylated monomer selected from the group consisting of acrylic acid, methacrylic acid, itaconic acid, aconitic acid, methacrylic acid dimer, crotonic acid, isocrotonic acid, angelic acid, teglic acid, senecioic acid, hexenic acid and the $C_1$–$C_{10}$ alkyl monoesters of maleic acid and fumaric acid, and
   g. sufficient hydroxymethyl diacetone acrylamide (HMDAA) to achieve an HMDAA level of at least about 0.40% with respect to total monomers in the entire latex blend; and B. an emulsion copolymer containing copolymerized therein
   h. monomers selected from the group of monomers consisting of $C_1$–$C_{10}$ alkyl diesters of maleic acid and fumaric acid,
   j. about 0.3-5% based on (h) monomers of a carboxylated monomer selected from the group consisting of acrylic acid, methacrylic acid, itaconic acid, itaconic acid, aconitic acid, methacrylic acid dimer, crotonic acid, hexenic acid and the $C_1$–$C_{10}$ alkyl monoesters of maleic acid and fumaric acid, and
   k. sufficient hydroxymethyl diacetone acrylamide (HMDAA) to achieve an HMDAA level of at least about 0.65% with respect to total monomers in the entire latex blend.

2. The latex blend of claim 1 wherein the emulsion copolymer of (I) contains polymerized therein about 50–70 parts of vinyl chloride and wherein the emulsion copolymer of (II) is the emulsion copolymer of (A).

3. The latex blend of claim 1 wherein the emulsion copolymer of (I) contains polymerized therein about 50–70 parts of vinyl chloride and the emulsion copolymer of (II) is the emulsion copolymer of (B).

4. The latex blend of claim 1 wherein the emulsion copolymmer of (I) contains polymerized therein about 50–98 parts of vinyl acetate and the emulsion copolymer of (II) is the emulsion copolymer of (A).

5. The latex blend of claim 1 wherein the emulsion copolymer of (I) contains polymerized therein about 50–98 parts of vinyl acetate and the emulsion copolymer of (II) is the emulsion copolymer of (B).

6. A latex paint comprising a pigmentary material and the latex blend of claim 1.

* * * * *